United States Patent

[11] 3,579,875

[72] Inventors Pierre J. Dubost
262, Avenue Daumesnil, 75 Paris;
Henry Perret, 7, Rue des Freres Lumiere,
92 Rueil-Malmaison, France
[21] Appl. No. 785,709
[22] Filed Dec. 20, 1968
[45] Patented May 25, 1971
[32] Priority Feb. 1, 1968
[33] France
[31] 138,246

[54] APPARATUS FOR THE SYSTEMATIC CORRECTION AND SELECTIVE APPRECIATION OF TEACHING TESTS
14 Claims, 6 Drawing Figs.

[52] U.S. Cl. .................................................. 35/48
[51] Int. Cl. ................................................. G09b 19/08
[50] Field of Search .......................................... 35/31, 35.6, 74, 48

[56] References Cited
UNITED STATES PATENTS
| | | | |
|---|---|---|---|
| 667,397 | 2/1901 | Jones............................ | 35/74 |
| 1,270,668 | 6/1918 | Spoor et al.................... | 35/74 |
| 1,346,929 | 7/1920 | Zion............................. | 35/74 |

Primary Examiner—Jerome Schnall
Assistant Examiner—J. H. Wolff
Attorney—Oldham and Oldham

ABSTRACT: Apparatus for systematic correction and assigning marks for teaching tests comprising a case having windows. Codes carried by four rotary discs mounted in the case can be caused to be displayed in the windows by rotation of the discs. The codes comprise codes of partial identification of questions, codes of appraisement of possible answers to each question, codes indicating the correct answer, codes indicating the value of the various questions, which complete the identification of each question, codes indicating the degree of difficulty of the test, as many codes of choice as there are possible answers to each question, codes of the marks assigned to the various answers, and a code corresponding to the marks given to the chosen answer.

PATENTED MAY 25 1971 3,579,875
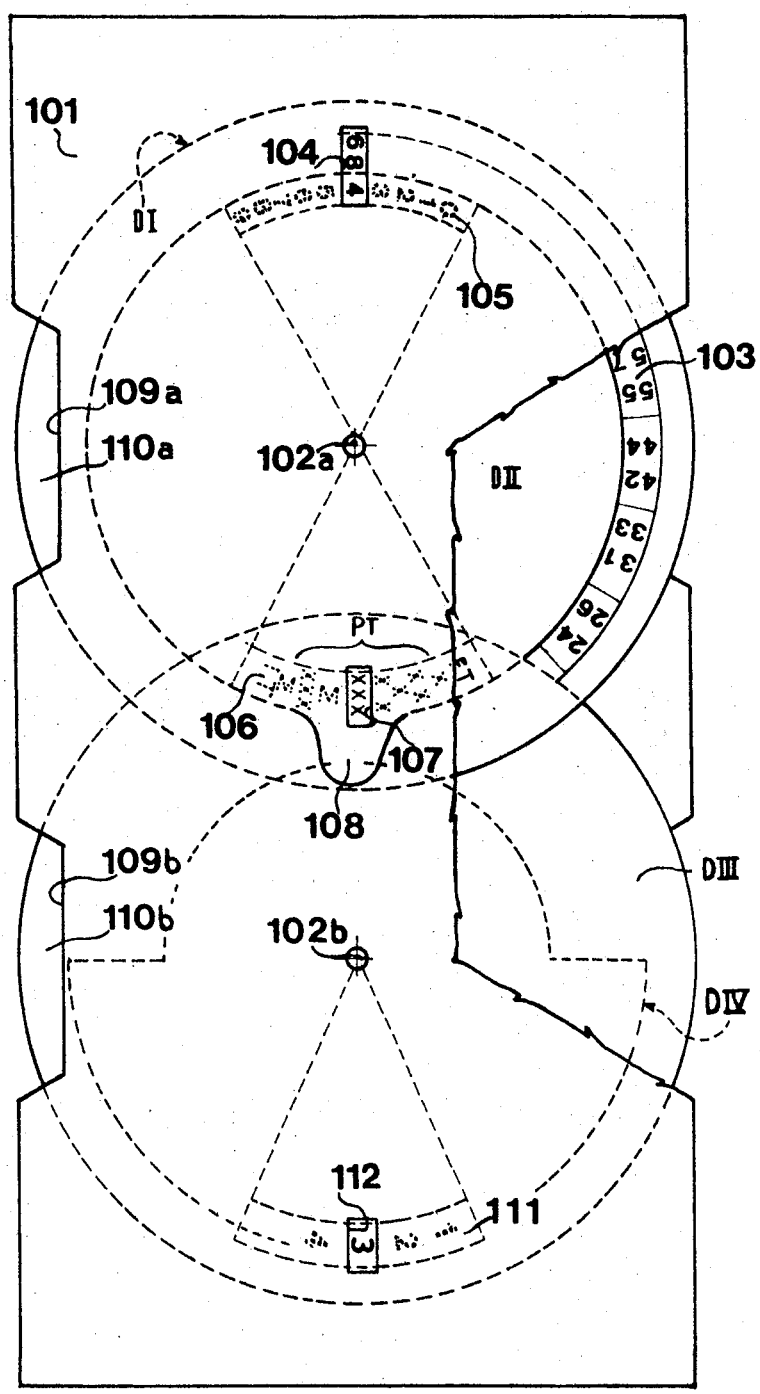
FIG:1

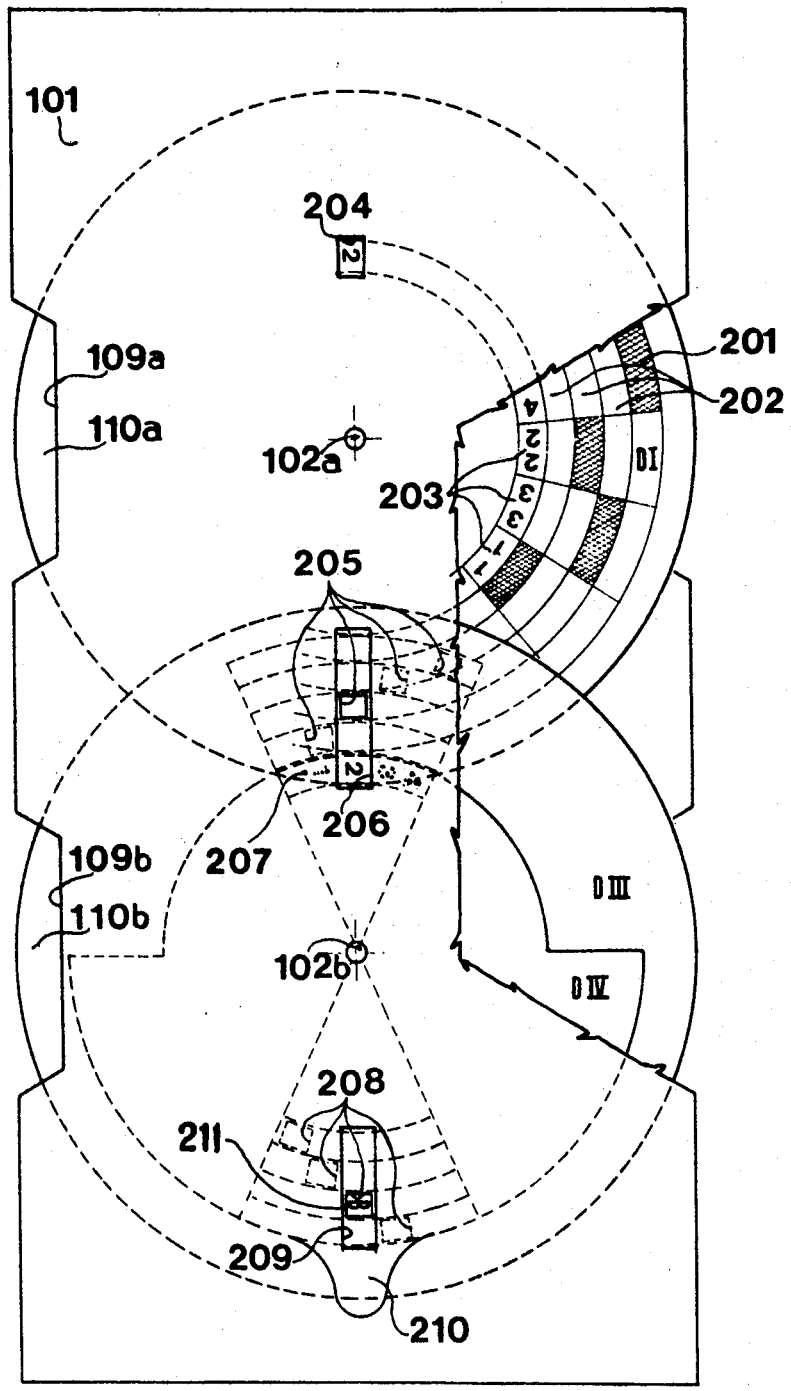
FIG:2

PATENTED MAY 25 1971
3,579,875
SHEET 3 OF 3
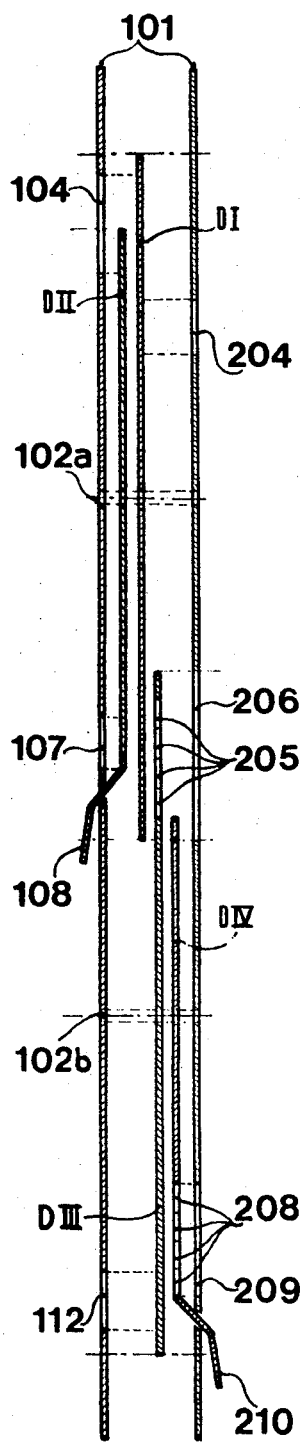
FIG: 3
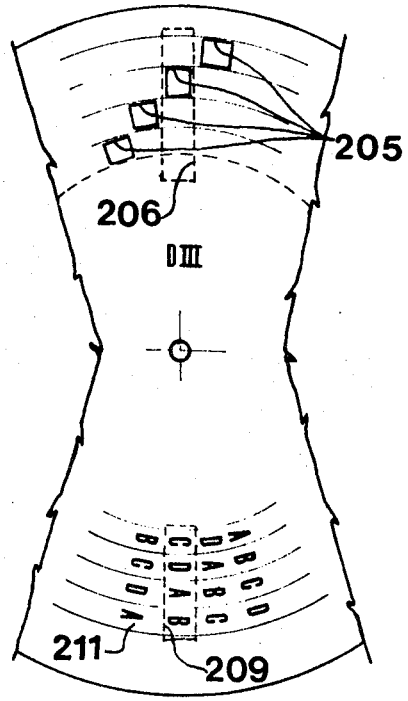
FIG: 5
FIG: 4
| | I.T. | P.T. | | | | F.T. |
|---|---|---|---|---|---|---|
| | | Σ | xxx | xx | x | |
| A | 10 | 20 | 7 | 5 | 2 | 20 |
| B | 5 | 12 | 5 | 2 | 1 | 11 |
| C | 2 | 5 | 2 | 1 | 0 | 5 |
| D | 0 | 0 | 0 | 0 | 0 | 0 |
FIG: 6
Inventors:
Pierre J. Dubost
Henri Perret
by
Oldham & Oldham
attorneys.

APPARATUS FOR THE SYSTEMATIC CORRECTION AND SELECTIVE APPRECIATION OF TEACHING TESTS

The present invention relates to a simple and cheap individual apparatus for the systematic correction and marking of teaching tests. Some of these tests are in the form of questions and a number of possible answers thereto face each question; these are known under the name of multiple-choice tests (see for example the work of Ellis WEITZMANN and Walter J. McNAMARA entitled "Constructing Classroom Examinations," pages 32—40—Science Research Association, Chicago, 1949) The user must chose the correct answer from these possible answers.

The object of the invention is to provide an apparatus which enables the user to know, by a series of simple manipulations, whether the chosen answer is correct or not, the apparatus providing at the same time information concerning the answer that should have been made and the marks attributed to the answer made.

The invention provides an apparatus for the systematic correction and marking of teaching tests comprising, in combination, in a flat case provided with windows in the two large front and rear walls of the case, a first rotary disc which carries on the front side first codes of partial identification of questions which are capable of appearing in a first window on the front of the case and on the rear side second codes of appraisement of the possible answers to each of said questions, said second codes being contained in circular sector divided into as many concentric areas as there are possible answers, each sector containing moreover a third code indicating the correct answer pertaining to said sector, said third code being capable of appearing in a first window on the back of the case; a second rotary disc concentric with said first disc and having a different diameter and carrying on the front side fourth codes indicating the value assigned to the various questions carried by said first disc so as to complete the identification of each of said questions, said fourth codes being capable of appearing next to said first codes carried by the front of said first disc in said first window, said second disc also carrying on said front side fifth codes indicating the degree of difficulty of the test in course which permit checking whether said identification of a question is correct and are capable of appearing in a third window on the front of the case; a third rotary disc mounted in said case in such manner as to partly cover the zone of said first disc which carries said second codes of appraisement of the possible answers, said third disc carrying on the front side as many sixth codes of choice as there are possible answers, said sixth codes being capable of appearing in a second window on the front of the case, said third disc comprising perforations which are radially and angularly offset in such manner as to allow to appear in a second window of the rear of the case only a single one of said concentric areas corresponding to the choice code shown in said second window of the front of said case, said third disc further comprising on the rear side thereof seventh codes of the marks assigned to the various answers carried by the rear of said first disc, said seventh codes being capable of appearing in a third window in the rear of said case; a fourth rotary disc concentric with said third disc and carrying eighth codes identical to said choice codes of the front of said third disc, said fourth disc comprising perforations which are angularly and radially offset and disposed in such manner as to be capable of passing in front of said seventh codes of the marks carried by the rear of said third disc so as to cause to appear in said third window on the rear of said case a ninth code corresponding to the marks given to the chosen answer; and means for manually rotating said discs.

Further features and advantages of the invention will be apparent from the ensuing description with reference to the accompanying drawings.

In the drawings:

FIG. 1 is a general view, with a part cut away, of the front or recto of the apparatus according to the invention;

FIG. 2 is a view, with a part cut away, of the rear of verso of the apparatus shown in FIG. 1;

FIG. 3 is an exploded longitudinal sectional view of the apparatus shown in FIG. 1;

FIG. 4 shows certain details of the perforated disc of the apparatus shown in FIG. 1;

FIG. 5 is a marks table reproduced on the perforated disc shown in FIG. 4, and

FIG. 6 is a numerical marks table which takes into account the standard of the questions.

The apparatus comprises a flat case 101 mainly consisting of two sheets of cardboard, plastics material or any other suitable material. Rotatably mounted between the two sheets of the case 101, in which are formed windows or apertures 104, 107, 112, 204, 206, 209, are four thin coded discs DI, DII, DIII, DIV (FIGS. 1 and 2). The discs DI, DII, DIII, DIV are respectively carried by two spindles 102 $a$ and 102 $b$ which also serve to assemble the case 101.

The disc DI carries on the front side codes 103 (FIG. 1) having two figures 00 to 99 partly indicating questions which are part of a questionnarie on which the user must work. The codes 103 are capable of appearing in a window or aperture 104 on the front of the case 101.

The disc DI carries on the rear side thereof codes 201, 202 of appraisement of the answers that can be given to each of the multiple-choice questions identified or indicated by the codes 103. The codes 201, 202 consist of four concentric areas, namely as many possible answers divided into as many sectors as there are question indicating codes 103. Each sector comprises a code 201, represented for example by a region of green color indicating a correct answer, and three codes 202, for example represented by regions of red color indicating three wrong answers. The codes 201, 202 are capable of appearing in a window or aperture 206 in the rear of the case 101.

A code 103 carried by the front of the disc DI and its corresponding code 201, 202 are placed in positions which are offset 180° so as to be capable of appearing respectively in windows 104 and 206, of which one is placed at one end of the case 101 and the other in the center part of the latter.

The disc DI also carries on the rear side thereof and facing each code 103 carried on the front side of the disc DI, a numerical code 203 (FIG. 2) indicating the correct answer to the question partly indicated by the corresponding code 103. The codes 203 are capable of appearing in a window or aperture 204 in the rear of the case 101. As each correct answer is among four possible answers, the codes 203 are figures 1 to 4. They occupy relative positions which are offset 180° relative to the corresponding appraisement codes 201, 202.

The disc DII, mounted to rotate about the spindle 102 $a$ and having a smaller diameter than the disc DI, partly covers the front side of the latter while it uncovers the codes 103.

It carries on the front side codes 105 indicating the value 0, 1...9 to assign to the questions partly identified by the codes 103 of the disc DI and codes 106 indicating the degree of difficulty of the test in course. In the illustrated example, the codes 106 respectively indicate an initial test IT, a progression test PT with its various levels Σ, $xxx,xx,x$ and a final test FT.

The codes 105 and 106 are capable of appearing respectively in the windows 104 and 107 on the front of the case (FIG. 1).

The codes 105 permit a complete identification of the questions already partly identified by the codes 103 carried on the front of the disc DI. The codes 106 permit checking whether the code displayed in the window 104 does actually correspond to the question put.

The disc DIII, mounted to rotate about the spindle 102 $b$ so as to partly cover the zone of the disc DI which carries the appraisement codes 201, 202, carries on the front side thereof choice codes 111 (FIG. 1) the number of which is equal to the number of possible answers. As the number of possible answers is four in the selected example, the codes 111 are the figures 1 to 4. These codes are capable of appearing in a window or aperture 112 formed on the front of the case.

The disc DIII is moreover provided with four perforations 205 (FIG. 2) which are radially offset so as to face one of the four code areas 201, 202 carried by the disc DI and angularly offset so as to occupy positions offset 180° relative to the four choice codes 111.

Such an arrangement of the perforations 205 ensures the appearance in the window 206 of only a single color code 201, 202 which corresponds to the chosen code 111 and permits, depending on its color, ascertaining the value of the answer chosen by the user.

The disc DIII carries on the rear side thereof codes 211 of the marks of the various answers, these codes being capable of appearing in a window or aperture 209 on the rear of the case 101 (FIG. 4). The codes 211 are in the form of a table such as that shown in FIG. 5 having four lines and four columns which are identical in pairs, each line and each column comprising the four letters, A, B, C, D placed in a suitable order and respectively representing the marks of the correct answer and of the three wrong answers. The letters B, C, D are marks codes which correspond to the answers which are progressively remote from the correct answer marked by the code A, the letter D corresponding to the wrong answer. The lines and the columns of this table are respectively disposed on concentric arcs of a circle having radii of the disc DIII, the columns of said table occupying positions which are offset 180° relative to the positions of the perforations 205 of this disc.

The disc DIV, mounted to rotate about the spindle 102 b, consists of two semicircles of different diameters. It partly covers the rear of the disc DIII and carries on the rear side in the part thereof of smaller diameter, codes 207 (FIG. 2) which are identical to the choice codes 111 carried by the third disc DIII. The codes 207 are capable of appearing in a window or aperture 206 next to the codes 201, 202.

The disc DIV also comprises four perforations 208 which are radially offset so as to face one of the four lines of the table of the codes 211 and angularly offset so as to occupy positions offset 180° relative to the four codes 207.

The disc DIV permits evaluating the value of the answer given by the user with respect to the correct answer.

The discs DIV and DII respectively carry thumb tabs 210 and 108 for rotating the discs, these tabs extending through slots formed in the case 101 and concentric with the discs (FIG. 3).

For the purpose of actuating the discs DI and DIII, the case 101 has notches 109 a and 109 b which render the edges 110 a and 110 b of the discs DI and DIII accessible.

The table shown in FIG. 6 permits assigning a numerical value to the marks codes 211 represented by the letters A, B, C, D, taking into account the degree of difficulty of the test in course, which is indicated by one of the codes 106 displayed in the window 107 in the front of the case 101.

The apparatus operates in the following manner:

A user is provided with a questionnaire comprising 1,000 questions, respectively identified by 1,000 three-figure codes 000 to 999, and the apparatus whose discs DI and DII respectively carry the codes 103 and 105 whereby it is possible to form the thousand codes of the questionnaire.

The codes 103 display the hundreds and tens and the codes 105 the units.

The user, who is assumed to be a student undergoing a progression test, must answer a given question, for example the question identified by the number 684 on the questionnaire.

Disposed in front of the question 684 are four possible answers, identified respectively by the numbers 1—4, the correct answer being among these four possible answers. The user must find the correct answer. He chooses answer No. 3.

It must now be ascertained whether the chosen answer is correct. If wrong, it must be ascertained how near it is to the correct answer.

For this purpose, the user turns the disc DI of the apparatus and displays in the window 104 in the front of the case 101 the code 68 partly corresponding to the number of the question to which he has just given an answer.

Then, by rotating the disc DII he displays in the window 104 one of the codes 105 of the value assigned to the question. In the case under consideration, the value code is four. He has therefore reconstituted the identification code of the question 684.

By so displaying this code, he causes to appear in the window 107 one of the codes 106 indicating the standard of the test. The code 106 which appears is the code identifying the level of the progression test. This enables the user by reference to his questionnaire, to check whether the question he has displayed is in fact the correct one.

Consequently, for the marking of his answers, the user must refer to the column of the table shown in FIG. 6.

Having displayed 684 in the window 104 by means of the discs DI and DII, the user turns the disc DIII so as to display in the window 112 one of the codes 111 indicating the answer he has chosen.

Having chosen the answer No. 3, he displays the FIG. 3. The FIG. 3 having been placed in the window 112 in the front of the case, the perforation 205 of the disc DIII, diametrally opposed to the FIG. 3, is in front of the window 206 on the rear of the case and uncovers one of the color codes 201 or 202 carried by the rear side of the disc DI which appraise the answer No. 3 to the question 684.

The user then turns the apparatus through 180° about its longitudinal axis and sees in the window 206 the appraisement corresponding to his choice, namely in the form of a square of green color if this choice is correct and red if not.

In the presently described example, the code which appears in the window 206 is one of the codes 202 corresponding to a wrong answer.

The user therefore already knows that he has made a mistake. At the same time, he can read in the window 204 in the rear of the case one of the codes 203 of identification of the correct answer, namely 2 in this case.

It now remains for the user to ascertain whether his answer is completely wrong or close to the correct answer.

For this purpose, he turns the disc DIV so as to make one of the codes 207 corresponding to the correct answer shown in the window 204, namely the code 2, to appear in the window 206.

The information of the answer given is retained by the disc DIII which remains stationary.

As the code 2 has been placed in front of the window 206, the perforation of the disc DIV, diametrally opposed thereto, is located in front of the window 209 and displays one of the marks codes 211 carried by the rear side of the disc DIII.

The user sees the letter B in the window 209 and deduces from this that the answer No. 3 chosen is close to the correct answer.

If the numerical value of the marks obtained is desired to be known, reference must be had to the table shown in FIG. 6 in which it can be seen that for a test of level xxx and an answer having the index B the marks obtained are 5.

The user must then conform to the instructions accompanying the exercise under consideration and make himself acquainted with the observations, information and advice so as to correct his errors and reach the correct solution.

Thus he will reach the correct answer by his own means.

On the other hand, if the code of appraisement appearing in the window 106 is a code 201, the answer chosen by the user is correct. He therefore knows that the marks he would obtain would be equal to the maximum taking into account the level of the test the question forms part of. Thus, in the case of a test of level xxx, he would obtain the marks 7.

The apparatus according to the invention, given by way of example, has been designed for a questionnaire of one thousand questions with four possible answers to each question. However, it will be understood that it is possible to adapt such an apparatus to a multiple-choice questionnaire having a greater or smaller number of questions with a greater or smaller number of possible answers to each question.

For this, it is sufficient to suitably adapt the number of codes 103 and 105 of the discs DI and DII to the number of questions of the questionnaire, and the number of areas of codes 201, 202 of the disc DI, the number of choice codes 111 and of perforations 205 of the disc DIII to the number of possible answers, the rest of the apparatus also being modified accordingly.

If it is desired to adapt the apparatus to the teaching of children or illiterate persons, the numerical symbols and alphabetic symbols employed in the example described can be replaced if desired by appropriate geometric or picture symbols. These symbols, and the numerical and alphabetic symbols, can be made in relief and in Braille alphabet for the blind.

Although a specific embodiment of the invention has been described, many modifications and changes may be made therein without departing from the scope of the invention as defined in the appended claims.

We claim:

1. An apparatus for the systematic correction and marking of teaching tests, comprising, in combination, a flat case having a large front wall having windows and a large rear wall having windows, a first rotary disc carrying on the front side thereof first codes of partial identification of questions which are capable of appearing in a first of said windows in said front wall and on the rear side of said disc second codes of appraisement of the possible answers to each of said questions, said second codes being contained in circular sectors divided into as many concentric areas as there are possible answers, each sector containing moreover a third code indicating the correct answer pertaining to said sector, said third code being capable of appearing in a first of said windows in said rear wall; a second rotary disc concentric with said first disc and having a different diameter and carrying on the front side thereof fourth codes indicating the value assigned to the various questions carried by said first disc so as to complete the identification of each of said questions, said fourth codes being capable of appearing next to said first codes carried by the front side of said first disc in said first window in said front wall, said second disc also carrying on the front side thereof fifth codes indicating the degree of difficulty of the test in course which permit checking whether said identification of a question is correct and are capable of appearing in a third of said windows in said front wall; a third rotary disc mounted in said case in such manner as to partly cover the zone of said first disc which carries said second codes of appraisement of the possible answers, said third disc carrying on the front side thereof as many sixth codes of choice as there are possible answers, said sixth codes being capable of appearing in a second of said windows in said front wall, said third disc comprising perforations which are radially and angularly offset in such manner as to allow to appear in a second of said windows in said rear wall only a single one of said concentric areas corresponding to the choice code shown in said second window of said front wall, said third disc further comprising on the rear side thereof seventh codes of the marks assigned to the various answers carried by the rear side of said first disc, said seventh codes being capable of appearing in a third of said windows in said rear wall; a fourth rotary disc concentric wit said third disc and carrying eighth codes identical to said choice codes of the front side of said third disc, said fourth disc comprising perforations which are angularly and radially offset and disposed in such manner as to be capable of passing in front of said seventh codes of the marks carried by the rear side of said third disc so as to cause to appear in said third window in said rear wall a ninth code corresponding to the marks given to the chosen answer; and means for manually rotating said discs.

2. An apparatus as claimed in claim 1, wherein said first codes and said second codes occupy relative positions offset 180° from each other.

3. An apparatus as claimed in claim 1, wherein said second codes and said third codes are carried by the rear side of said first disc and occupy relative positions which are offset 180° from each other.

4. An apparatus as claimed in claim 1, wherein said sixth codes and said perforations in said third disc are of equal number, each perforation occupying a position offset 180° relative to the position of the corresponding one of said sixth codes.

5. An apparatus as claimed in claim 1, wherein said seventh codes are in the form of a table of codes, the lines and the columns of said table respectively comprising as many marks codes as there are possible answers.

6. An apparatus as claimed in claim 5, wherein each code of a line having a given rank is identical to the corresponding code of a column having the same rank.

7. An apparatus as claimed in claim 6, wherein said lines and columns of said marks code table are respectively disposed on arcs of concentric circles and radii of said third disc, the columns of said table occupying positions which are offset 180° relative to the positions of the perforations of said third disc.

8. An apparatus as claimed in claim 1, wherein said eighth codes identical to said sixth codes and said perforations of said fourth disc are of equal number each of said eighth codes being offset 180° from one perforation of said fourth disc.

9. An apparatus as claimed in claim 1, wherein said means for rotating said first and third discs comprise notches in said front and rear walls of said case through which extend said discs.

10. An apparatus as claimed in claim 1, wherein said means for rotating said second and fourth discs comprise thumb tabs carried by said discs and which extend through slots formed in said case concentrically of said discs.

11. An apparatus an claimed in claim 1, wherein said codes comprise figures.

12. An apparatus as claimed in claim 1, wherein said codes comprise letters.

13. An apparatus as claimed in claim 1, wherein said codes comprise colored areas.

14. An apparatus as claimed in claim 1, wherein said codes consist of projecting portions, for example for Braille reading.

UNITED STATES PATENT OFFICE
CERTIFICATE OF CORRECTION

Patent No. 3,579,875　　　　　　　　　Dated May 25, 1971

Inventor(s) Pierre J. Dubost et al.

It is certified that error appears in the above-identified patent and that said Letters Patent are hereby corrected as shown below:

Column 1, line 28, "sector" should read -- sectors --; line 74, "of", second occurrence, should read -- or --. Column 6, line 3, "wit" should read -- with --; line 49, "an" should read -- as --.

Signed and sealed this 15th day of February 1972.

(SEAL)
Attest:

EDWARD M. FLETCHER, JR.　　　　　ROBERT GOTTSCHALK
Attesting Officer　　　　　　　　　Commissioner of Patents